US012572368B2

(12) United States Patent
Sun et al.

(10) Patent No.: US 12,572,368 B2
(45) Date of Patent: Mar. 10, 2026

(54) SERVER PREBOOT FUNCTION SELF-ADAPTIVE SUPPORTING METHOD AND APPARATUS

(71) Applicant: Suzhou MetaBrain Intelligent Technology Co., Ltd., Jiangsu (CN)

(72) Inventors: Yongbo Sun, Jiangsu (CN); Daotong Li, Jiangsu (CN)

(73) Assignee: Suzhou MetaBrain Intelligent Technology Co., Ltd., Suzhou (CN)

( * ) Notice: Subject to any disclaimer, the term of this patent is extended or adjusted under 35 U.S.C. 154(b) by 0 days.

(21) Appl. No.: 19/238,771

(22) Filed: Jun. 16, 2025

(65) Prior Publication Data

US 2025/0306954 A1 Oct. 2, 2025

Related U.S. Application Data

(63) Continuation of application No. PCT/CN2024/097565, filed on Jun. 5, 2024.

(30) Foreign Application Priority Data

Aug. 1, 2023 (CN) .......................... 202310955447.3

(51) Int. Cl.
  *G06F 9/44* (2018.01)
  *G06F 8/41* (2018.01)
  *G06F 9/4401* (2018.01)
(52) U.S. Cl.
  CPC .............. *G06F 9/4416* (2013.01); *G06F 8/41* (2013.01)
(58) Field of Classification Search
  None
  See application file for complete search history.

(56) References Cited

U.S. PATENT DOCUMENTS

2015/0363713 A1* 12/2015 Lewis ................ G06Q 10/0631
                                                        705/7.12
2019/0339988 A1 11/2019 Liu et al.

FOREIGN PATENT DOCUMENTS

CN       110413328 A       11/2019
CN       112905251 A       6/2021
            (Continued)

OTHER PUBLICATIONS

International Search Report of corresponding PCT application (PCT/CN2024/097565) Sep. 14, 2024, 6 pages.
(Continued)

*Primary Examiner* — Fahmida Rahman
(74) *Attorney, Agent, or Firm* — Cooper Legal Group LLC

(57) ABSTRACT

The present disclosure relates to the technical field of computers. Disclosed are a server preboot function self-adaptive supporting method and apparatus. The method includes: when target indication information is acquired, traversing network card devices in a network card device library, where the target indication information is configured for representing that a target object has a customization requirement on enabling/disabling of a preboot execution environment function; selecting, from the network card devices, a target network card device corresponding to the customization requirement, and a target port of the target network card device; enabling the preboot execution environment function of the target port, and disabling the preboot execution environment function of a reference port other than the target port in the target network card; and compiling the customization requirement into a version file and burning the version file into a read-only memory of a basic input/output system.

20 Claims, 5 Drawing Sheets

(56)          References Cited

FOREIGN PATENT DOCUMENTS

| CN | 113190279 | A | 7/2021 |
| CN | 115562738 | A | 1/2023 |
| CN | 116700809 | A | 9/2023 |

OTHER PUBLICATIONS

Written Opinion of International Searching Authority of corresponding PCT application (PCT/CN2024/097565) Sep. 14, 2024, 6 pages.
First Office Action of corresponding CN priority application (CN202310955447.3) Sep. 8, 2024, 15 pages.
Notification to Grant Patent Right for Invention of corresponding CN priority application (CN202310955447.3) Sep. 27, 2024, 3 pages.

* cited by examiner

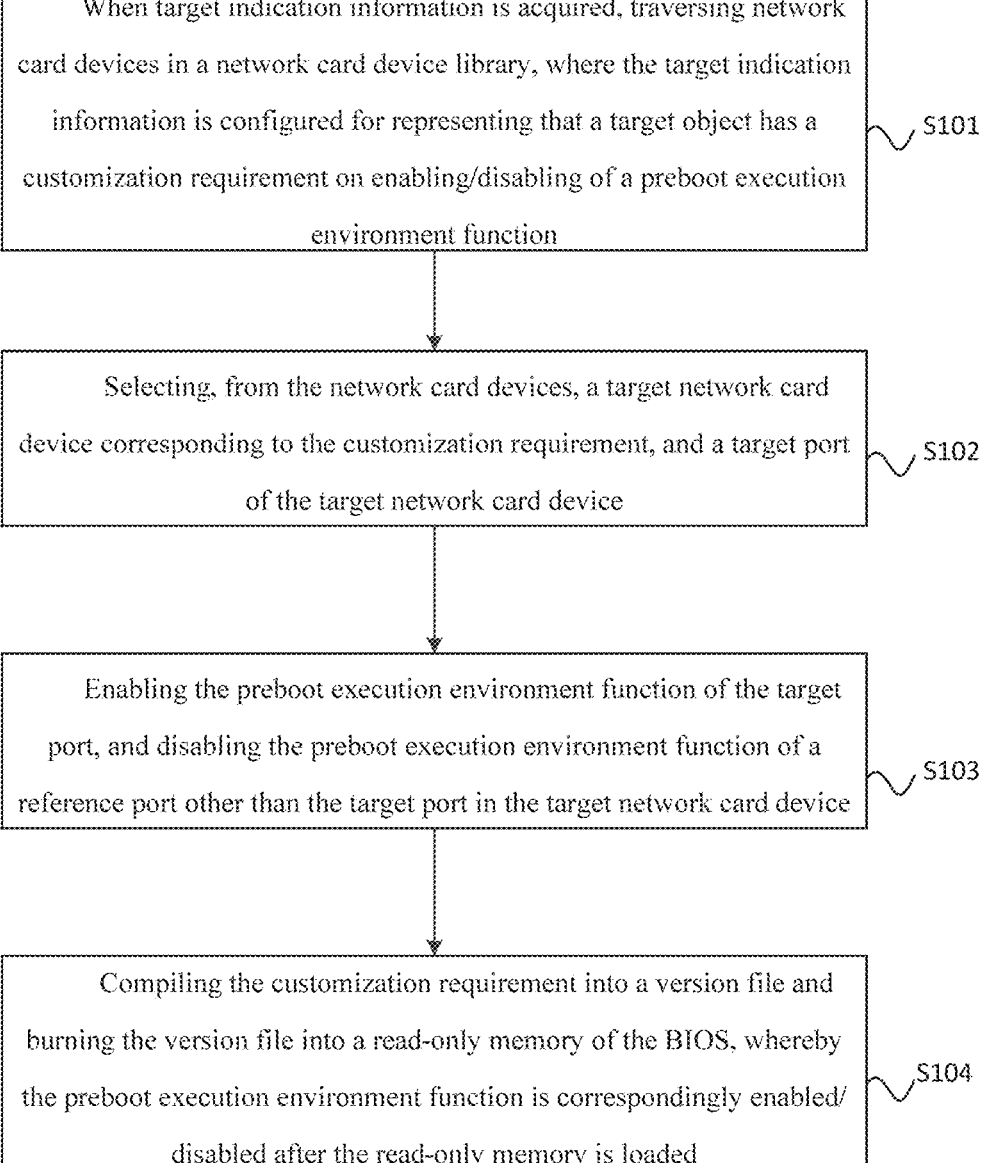

When target indication information is acquired, traversing network card devices in a network card device library, where the target indication information is configured for representing that a target object has a customization requirement on enabling/disabling of a preboot execution environment function

S101

Selecting, from the network card devices, a target network card device corresponding to the customization requirement, and a target port of the target network card device

S102

Enabling the preboot execution environment function of the target port, and disabling the preboot execution environment function of a reference port other than the target port in the target network card device

S103

Compiling the customization requirement into a version file and burning the version file into a read-only memory of the BIOS, whereby the preboot execution environment function is correspondingly enabled/disabled after the read-only memory is loaded

Traversing module ⟋ 501

Selection module ⟋ 502

Execution module ⟋ 503

Burning module ⟋ 504

Processor ⟋ 10

Memory ⟋ 20

Communication interface ⟋ 30

1

SERVER PREBOOT FUNCTION SELF-ADAPTIVE SUPPORTING METHOD AND APPARATUS

CROSS-REFERENCE TO RELATED APPLICATION

This application is a continuation of International Patent Application PCT/CN2024/097565, filed Jun. 5, 2024, which claims priority to Chinese Patent Application No. 202310955447.3, filed on Aug. 1, 2023 in China National Intellectual Property Administration and entitled "SERVER PREBOOT FUNCTION SELF-ADAPTIVE SUPPORTING METHOD AND APPARATUS". International Patent Application PCT/CN2024/097565 and Chinese Patent Application No. 202310955447.3 are hereby incorporated by reference in their entireties.

FIELD

The present disclosure relates to the technical field of computers, and in particular, to a server preboot function self-adaptive supporting method and apparatus.

BACKGROUND

At present, after initializing a network card, a basic input/output system (BIOS) may establish a boot entry for each network card port in a BIOS setup window; and there is also a dedicated function key to display all boot entries or all network card port boot entries for users to enable/disable a preboot execution environment (PXE) function for each network card port.

In a case of the functional processing, if a client wants to disable the PXE function of some ports of a network card, the system needs to be powered on to enter a corresponding window on the BIOS setup interface and disable the boot entry of the corresponding network card port, or disable a corresponding dedicated setting entry for controlling the PXE function of the network card port, then saves the setting, and is restarted to achieve the purpose; or the system needs to be started to boot an operating system (OS) or a unified extensible firmware interface (UEFI) shell and then executes shell scripts to control the PXE function.

However, the aforementioned method in the related art for disabling the PXE function of the port has the problems that the whole setting procedure is complex and inconvenient, and the PXE function of the client network card cannot be customized, which fails to meet the client requirements.

SUMMARY

In a first aspect, the present disclosure provides a server preboot function self-adaptive supporting method, which includes:

in response to that acquiring target indication information is acquired, traversing network card devices in a network card device library, where the target indication information is configured for representing that a target object has a customization requirement on enabling/disabling of a preboot execution environment function;

selecting, from the network card devices, a target network card device corresponding to the customization requirement, and a target port of the target network card device;

enabling the preboot execution environment function of the target port, and disabling the preboot execution environment function of a reference port other than the target port in the target network card device; and compiling the customization requirement into a version file and burning the version file into a read-only memory of a basic input/output system, whereby the preboot execution environment function is correspondingly enabled/disabled after the read-only memory is loaded.

In an optional implementation, prior to the traversing network card devices in a network card device library, the method further includes:

acquiring a plurality of preset devices;

determining whether each preset device is a network card device according to a target value of a register in a configuration space of the preset device; and in response to determining that the preset devices are the network card devices, generating the network card device library from the preset devices.

In an optional implementation, prior to the selecting, from the network card devices, a target network card device corresponding to the customization requirement, and a target port of the target network card device, the method further includes:

in response to acquiring instruction information including a plurality of signal values, determining a corresponding topological type according to the instruction information; and determining a target design diagram according to the topological type.

In an optional implementation, the selecting, from the network card devices, a target network card device corresponding to the customization requirement, and a target port of the target network card device includes:

acquiring the target network card device from the network card devices according to the target design diagram and the customization requirement; and selecting the target port from a plurality of ports of the target network card device according to the target design diagram and the customization requirement.

In an optional implementation, the acquiring the target network card device from the network card devices according to the target design diagram and the customization requirement includes:

acquiring the target network card device corresponding to the customization requirement from the network card devices in a depth-first traversing manner according to the target design diagram.

In an optional implementation, after the acquiring the target network card device corresponding to the customization requirement from the network card devices, the method further includes:

acquiring a historical global variable value, where the historical global variable value is configured for indicating a number of the traversed network card devices in the network card device library;

adding a preset value to a serial number of the target network card device; and obtaining a global variable value corresponding to the target network card device based on the historical global variable value and the preset value.

In an optional implementation, the acquiring the target network card device from the network card devices according to the target design diagram and the customization requirement includes:

acquiring a bus value and a device value of each network card device according to the target design diagram; and acquiring the target network card device according to the bus value, the device value, and the customization requirement.

In an optional implementation, the acquiring the target network card device according to the bus value, the device value, and the customization requirement includes:

comparing the bus values of the network card devices, and sorting the bus values according to a preset sequence to obtain a first sorting result;

in response to that the bus values of any preset number of reference network card devices are the same, comparing the device values of the reference network card devices;

sorting the reference network card devices according to the device values to obtain a second sorting result; and acquiring the target network card device according to the customization requirement, the first sorting result, and the second sorting result.

In an optional implementation, the selecting the target port from a plurality of ports of the target network card device according to the target design diagram and the customization requirement includes:

acquiring a port number of each port of the target network card device according to the target design diagram; and selecting the target port from the plurality of ports according to the customization requirement and the port number.

In an optional implementation, the selecting the target port from a plurality of ports of the target network card device according to the target design diagram and the customization requirement includes:

acquiring a current position value of each port of the target network card device according to the target design diagram; and selecting the target port from the plurality of ports according to the customization requirement and the position value.

In an optional implementation, the method further includes:

in response to adaptively supporting enabling/disabling of the preboot execution environment function in a basic input/output system scenario, acquiring the target network card device according to the customization requirement, the first sorting result, and the second sorting result; and sorting the ports according to the position values, and acquiring the target port according to the customization requirement.

In an optional implementation, the method further includes:

in response to adaptively supporting enabling/disabling of the preboot execution environment function in an operating system scenario, acquiring the target network card device according to the customization requirement, the first sorting result, and the second sorting result; and sorting the ports according to the position values, and acquiring the target port according to the customization requirement.

In an optional implementation, the selecting the target port from a plurality of ports of the target network card device according to the target design diagram and the customization requirement includes:

acquiring a current position value of each port of the target network card device according to the target design diagram;

generating a first array according to the position values;

acquiring the customization requirement of the target object for identifying and sorting the ports;

adjusting the first array according to the customization requirement to obtain a second array; and selecting the target port from the second array.

In an optional implementation, the selecting, from the network card devices, a target network card device corresponding to the customization requirement includes:

determining a target bus value according to the customization requirement;

acquiring a preset bus value range corresponding to each network card device, where the preset bus value ranges are not overlapped;

performing matching between the target bus value and the preset bus value range; and in response to that the target bus value falls within a target bus value range, taking a network card device corresponding to the target bus value range as the target network card device corresponding to the target bus value, where the target bus value range is included in the preset bus value range.

In an optional implementation, after taking a network card device corresponding to the target bus value range as the target network card device corresponding to the target bus value, the method further includes:

determining a corresponding target port according to the target network card device; and determining a slot accommodating a processor according to the target port.

In an optional implementation, the number of the target network card devices is multiple, and the number of the target ports is multiple.

In an optional implementation, the enabling the preboot execution environment function of the target port includes:

enabling the preboot execution environment function of the target port by employing an on-demand read-only memory driver file.

In a second aspect, the present disclosure provides a server preboot function self-adaptive supporting apparatus, which includes:

a traversing module, configured to traverse network card devices in a network card device library in response to acquiring target indication information, where the target indication information is configured for representing that a target object has a customization requirement on enabling/disabling of a preboot execution environment function;

a selection module, configured to select, from the network card devices, a target network card device corresponding to the customization requirement, and a target port of the target network card device;

an execution module, configured to enable the preboot execution environment function of the target port, and disable the preboot execution environment function of a reference port other than the target port in the target network card; and a burning module, configured to compile the customization requirement into a version file and burn the version file into a read-only memory of a basic input/output system, whereby the preboot execution environment function is correspondingly enabled/disabled after the read-only memory is loaded.

In a third aspect, the present disclosure provides a computer device, including a memory and a processor, where the memory and the processor are in communication connection with each other, the memory has computer instructions stored therein, the processor executes the computer instructions to execute the server preboot function self-adaptive supporting method in the first aspect or any corresponding implementation.

In a fourth aspect, the present disclosure provides one or more non-volatile computer-readable storage media having computer instructions stored therein, where the computer-readable instructions, when executed by one or more processors, cause the one or more processors to perform the server preboot function self-adaptive supporting method in the first aspect or in any corresponding implementation.

BRIEF DESCRIPTION OF THE DRAWINGS

In order to more clearly illustrate the technical solutions in specific embodiments of the present disclosure or in the prior art, drawings used in the specific embodiments or the description of the prior art are simply described below. Apparently, the drawings in the following description are some embodiments of the present disclosure. For those ordinary skilled in the art, other drawings can be obtained without creative effort according to these drawings.

FIG. 1 is a schematic flowchart of a server preboot function self-adaptive supporting method according to one or more embodiments of the present disclosure;

DETAILED DESCRIPTION

Figure 2:
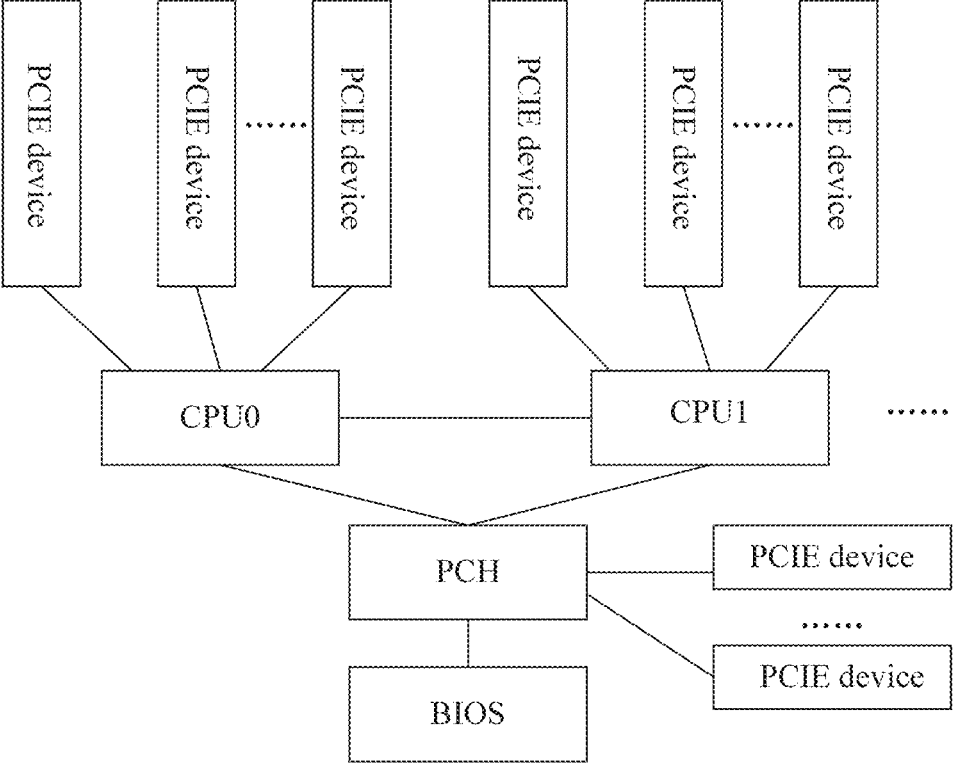
FIG. 2 is a schematic diagram of server preboot function self-adaptive supporting hardware according to one or more embodiments of the present disclosure.

To make the purposes, technical solutions and advantages of embodiments of the present disclosure clearer, the technical solutions in the embodiments of the present disclosure are described clearly and completely in conjunction with accompanying drawings in the embodiments of the present disclosure. Apparently, the described embodiments are some embodiments of the present disclosure, not all embodiments. All other embodiments obtained by those skilled in the art based on the embodiments of the present disclosure without creative efforts shall fall within the scope of protection of the present disclosure.

At present, after a basic input/output system (BIOS) initializes a network card, if a client wants to disable a preboot execution environment (PXE) function of some ports of a network card, the system usually needs to be powered on to enter a corresponding window of a BIOS setup window to disable a boot entry of a corresponding network card port, or disable a corresponding dedicated setting entry for controlling the PXE function of the network card port, then saves the setting, and is restarted to achieve a purpose, or controls enabling/disabling of the PXE function by compiling shell scripts.

However, the method in the related art has a lot of disadvantages: first, the method requires to enter a BIOS window interface for setting, or requires power-on to boot an operating system (OS) or a unified extensible firmware interface (UEFI) shell environment to execute scripts for setting, which is inconvenient for clients to perform machine deployment or function inspection of machines in factories before leaving the factories, and the disadvantages are more apparent when controlling batch machines; second, the method cannot customize the client requirement on the PXE function of a network card, for example, the BIOS cannot be customized according to the client requirements, and the method still requires to enter the BIOS setup window for setting, or meets the client requirement by means of scripts, which is inconvenient attain the client requirement; and third, when configurations of the network card of the client are changed, such as increasing or reducing a number of network cards, or changing a position of a slot of the network card, the settings of the original scripts or BIOS setup window interface are no longer applicable, whereby the scripts need to be re-developed, or the settings of the BIOS setup window interface need to be changed.

To solve the above problems, according to embodiments of the present disclosure, provided is a server preboot function self-adaptive supporting method. Embodiment: it should be noted that steps shown in flowcharts in the accompanying drawings may be executed in a computer system including, for example, a group of computer executable instructions. Moreover, although a logic sequence is shown in the flowcharts, the shown or described steps may be executed in a different sequence in some cases.

In the present embodiment, provided is a server preboot function self-adaptive supporting method. FIG. 1 is a flowchart of a server preboot function self-adaptive supporting method according to an embodiment of the present disclosure. As shown in FIG. 1, the method may be applied to a basic input/output system (BIOS) side, and the method includes the following steps:

Step S101: when target indication information is acquired, traversing network card devices in a network card device library, where the target indication information is configured for representing that a target object has a customization requirement on enabling/disabling of a preboot execution environment function.

Optionally, in the embodiment of the present disclosure, when the BIOS receives the target indication information from the target object, and it is determined that the target object has the customization requirement on the enabling/disabling of the preboot execution environment function, the network card devices stored in the network card device library are traversed one by one.

It may be understood that the target object here may be a client. The customization requirement includes a requirement proposed by the target object for PXE customization, for example, a first port (such as port0) of a first enumerated network card supports the PXE function, and other network cards and ports do not support the PXE function. The target object enumerates the customization requirements in a customization requirement file, such as an Excel file, a Word document, and a PDF file, a corresponding functional code is generated by the development personnel based on the customization requirement file, and the corresponding functional code is the customization requirement of the present embodiment. The customization requirement includes one or more functional code segments of the customization function.

Step S102: selecting, from the network card devices, a target network card device corresponding to the customization requirement, and a target port of the target network card device.

Optionally, the target network card device is selected from a plurality of network card devices in the network card device library according to the customization requirement, and then the target port is selected from a plurality of ports of the target network card device.

Step S103: enabling the preboot execution environment function of the target port, and disabling the preboot execution environment function of a reference port other than the target port in the target network card device.

Optionally, it is determined that the enabling/disabling of the PXE function may be executed for the target port and another reference port other than the target port according to the customization requirement. Specifically, the PXE function of the target port is enabled, and the PXE function of the reference port is disabled.

It may be known that both the target port and the reference port are ports in the target network card device.

Step S104: compiling the customization requirement into a version file and burning the version file into a read-only memory of the BIOS, whereby the preboot execution environment function is correspondingly enabled/disabled after the read-only memory is loaded.

Optionally, the customization requirement is compiled into the BIOS to obtain a new version file, then the new version file is burned onto the read-only memory (ROM) of the BIOS, and after a machine is powered on and booted, the ROM may be loaded to enable/disable the corresponding PXE function.

Specifically, the customization requirement is integrated as the functional code into an original BIOS code, and the BIOS code is edited to generate a new BIOS file. The new BIOS file is the aforementioned new version file. The new BIOS file typically adopts a binary format or various encrypted binary formats, including but not limited to the formats such as .bin, .rom, .hpm, and .cap. After the new BIOS file is burned onto the ROM of the machine BIOS, the new BIOS file takes effect when the machine BIOS is booted, and the customization requirement function added by the target object may also take effect.

In the embodiments of the present disclosure, according to the customization requirement of the target object on enabling/disabling of the PXE function, the target network card device corresponding to the customization requirement and the target port may be selected from the network card devices; subsequently, the PXE function of the selected target port is enabled, and the PXE function of the other reference port other than the target port is disabled; thereafter, the customization requirement of the target object is burned into the ROM of the BIOS, thereby adaptively achieving the customization requirement of the target object on the PXE function of the network card, improving the function implementation way, solving the problems in the related art such as complex and inconvenient setting procedure, meeting the client requirements, and improving the client satisfaction.

In some optional implementations, prior to the traversing network card devices in a network card device library, the method further includes:
acquiring a plurality of preset devices;
determining whether each preset device is a network card device according to a target value of a register in a configuration space of the preset device; and when determining that the preset devices are the network card devices, generating the network card device library from the preset devices.

Optionally, when traversing the network card devices, the BIOS needs to read the target value of the register in the configuration space of each preset device (i.e., a peripheral component interconnect express (PCIE)) device, for example, when the target value is 1, it indicates that the preset device is the network card device, and when the target value is 0, it indicates that the preset device is not the network card device. When it is determined that the preset devices are the network card devices, the network card device library is generated according to a plurality of preset devices.

In the embodiments of the present disclosure, the target value of the register is configured for determining which preset devices are the network card devices, whereby the network card device library is obtained, which facilitates the selection of the target network card device from the network card device library.

In some optional implementations, prior to the selecting, from the network card devices, a target network card device corresponding to the customization requirement, and a target port of the target network card device, the method further includes:
when instruction information including a plurality of signal values is acquired, determining a corresponding topological type according to the instruction information; and
determining a target design diagram according to the topological type.

Optionally, in the embodiments of the present disclosure, since configurations of the network card devices and the ports of the network card device are determined by a hardware topology, in the method of the present embodiment, the design diagram determined by the hardware topology needs to be first determined, and then the target network card device and the target port are selected based on the design diagram.

Further, when the BIOS receives the instruction information including a plurality of signal values (such as 01110), the corresponding topological type (for example, the topological type is 1) is determined according to the instruction information; and subsequently, based on a correspondence between the topological type and the design diagram, such as one topological type corresponds to one design diagram, the corresponding target design diagram is determined.

In the embodiments of the present disclosure, the topological type of the hardware topology is obtained according to the current instruction information, and then the target design diagram is determined according to the topological type, whereby the information such as the network card port may be determined according to the target design diagram.

In some optional implementations, the selecting, from the network card devices, a target network card device corresponding to the customization requirement, and a target port of the target network card device includes:
acquiring the target network card device from the network card devices according to the target design diagram and the customization requirement; and
selecting the target port from a plurality of ports of the target network card device according to the target design diagram and the customization requirement.

Optionally, based on the target design diagram, a processor slot of each network card device and a position of the network card device may be determined, and then the target network card device is further determined according to the customization requirement. Similarly, an arrangement and a specific position of each port in the target network card device may be determined according to the target design diagram, and then the target port is further determined according to the customization requirement.

In the embodiments of the present disclosure, a more accurate target network card device and target port can be determined by combining the target design diagram and the customization requirement.

In some optional implementations, the acquiring the target network card device from the network card devices according to the target design diagram and the customization requirement includes:

acquiring the target network card device corresponding to the customization requirement from the network card devices in a depth-first traversing manner according to the target design diagram.

Optionally, in the embodiments of the present disclosure, when a plurality of network card devices are traversed, the network card devices are traversed in a depth-first traversing manner. The first traversed network card device may be selected, this network card device may be accessed first, then an adjacent network card device of this network card device is taken as an initial node, and the first adjacent network card device is accessed. That is, after the current network card device is accessed every time, the first adjacent network card device of the current network card device is first accessed. When the target network card device is selected from a plurality of network card devices in this manner, the accurate target network card device is found according to the customization requirement.

In the embodiments of the present disclosure, the target network card device corresponding to the customization requirement is selected from the plurality of network card devices in the depth-first traversing manner, whereby labor cost for repeatedly developing versions and scripts and maintaining code branches in conventional methods in the past is reduced, and an error probability is reduced.

In some optional implementations, after the acquiring the target network card device corresponding to the customization requirement from the network card devices, the method further includes:

acquiring a historical global variable value, where the historical global variable value is configured for indicating a number of the traversed network card devices in the network card device library;

adding a preset value to a serial number of the target network card device; and obtaining a global variable value corresponding to the target network card device based on the historical global variable value and the preset value.

Optionally, in the embodiments of the present disclosure, the traversed and scanned network card devices are recorded by means of global variables. For example, starting from 0, a value of the corresponding global variable is added by 1 each time a network card device is enumerated.

Specifically, since the values of global variables are cumulative, when obtaining the target network card device, the value of the historical global variable needs to be obtained first, such as a value 3, and then a preset value (such as 1) is added to this historical global variable value 3 to obtain a value 4. The value 4 is the global variable value corresponding to the target network card device.

In the embodiments of the present disclosure, the global variable value of the network card device is continuously updated to achieve a real-time purpose, which is convenient to fine the accurate target network card device according to the customization requirement of the client.

In some optional implementations, the acquiring the target network card device from the network card devices according to the target design diagram and the customization requirement includes:

acquiring a bus value and a device value of each network card device according to the target design diagram; and acquiring the target network card device according to the bus value, the device value, and the customization requirement.

Optionally, after the target design diagram is determined, the bus value and the device value of each network card device may be obtained, the bus values and the device values are recorded, and the network card devices are sorted based on the bus values and the device values; and subsequently, the target network card device meeting the customization requirement is selected from the sorted network card devices according to the customization requirement.

In the embodiments of the present disclosure, based on the bus value and the device value of each network card device, the target network card device meeting the customization requirement is obtained, thereby improving the client satisfaction.

In some optional implementations, the acquiring the target network card device according to the bus value, the device value, and the customization requirement includes:

comparing the bus values of the network card devices, and sorting the bus values according to a preset sequence to obtain a first sorting result;

when the bus values of any preset number of reference network card devices are the same, comparing the device values of the reference network card devices;

sorting the reference network card devices according to the device values to obtain a second sorting result; and acquiring the target network card device according to the customization requirement, the first sorting result, and the second sorting result.

Optionally, a scanning sequence of the network card devices may be determined by a sequence of the bus values and the device values that are sorted in an ascending sequence. A specific comparison manner is as follows: the bus values of the network card devices are first compared, the bus values are sorted in a preset sequence to obtain the first sorting result; if the bus values of any preset number, such as any two of the network card devices are the same, the two network card devices are called the reference network card devices; and then the device values of the two network card devices are compared, and the device values are employed to sort the reference network card devices to obtain the second sorting result.

The target network card device is selected from a plurality of network card devices according to the first sorting result, the second sorting result, and the customization requirement.

In the embodiments of the present disclosure, based on the first sorting result of the bus values and the second sorting result of the device values, the target network card device meeting the customization requirement of the client is obtained, thereby improving the client satisfaction.

In some optional implementations, the selecting the target port from a plurality of ports of the target network card device according to the target design diagram and the customization requirement includes:

acquiring a port number of each port of the target network card device according to the target design diagram; and

selecting the target port from the plurality of ports according to the customization requirement and the port number.

Optionally, after the target design diagram is determined, the port number of each port included in each network card device may be obtained, and then the customization requirement is obtained; for example, the customization requirement is that a first port (such as port0) of a first enumerated network card supports the PXE function, and other network cards and ports do not support the PXE function, at this time, after the first enumerated target network card device is found, the target port (corresponding to port0) with the port number of 0 is found to load the on-demand ROM driver file, and the loading of the on-demand ROM driver file is skipped for other network cards and ports; and in this way, the port0 of the first enumerated network card supports the PXE function, while other network cards and ports do not support the PXE function.

In the embodiments of the present disclosure, as long as the port number of each port of the target network card device is determined according to the target design diagram, the target port meeting the customization requirement of the client may be obtained, thereby eliminating the complexity of the traditional method, reducing the error probability, and improving the robustness and competitiveness of a BIOS code.

In some optional implementations, the selecting the target port from a plurality of ports of the target network card device according to the target design diagram and the customization requirement includes:

acquiring a current position value of each port of the target network card device according to the target design diagram;

selecting the target port from the plurality of ports according to the customization requirement and the position value.

Optionally, after the target design diagram is determined, the current position values of all ports included in each network card device may be obtained. For example, the port number starts from 0, whereby the corresponding position value of Port N (which may be 0, 1, 2, 3, etc.,) can be obtained.

If the client requires to support the PXE function of the $N^{th}$ port of the target network card device in a specific slot, the $N^{th}$ port is selected as the target port according to the position value of each port.

In the embodiments of the present disclosure, as long as the current position value of each port is determined according to the target design diagram, the target port meeting the customization requirement may be obtained, thereby eliminating the complexity of the traditional method, reducing the error probability, and improving the robustness and competitiveness of the BIOS code.

In some optional implementations, the method further includes:

when adaptively supporting enabling/disabling of the preboot execution environment function in a BIOS scenario, acquiring the target network card device according to the customization requirement and the second sorting result; and sorting the ports according to the position values, and acquiring the target port according to the customization requirement.

Optionally, in the embodiments of the present disclosure, in the initial scenario of the BIOS, the $N^{th}$ port of the $M^{th}$ network card in an enumeration sequence supports the PXE function. At this time, the correspondence between the slot and the port of the network card device CPU is identified according to the target design diagram, and then a sorting position of the network card of each network card device in all slots is identified according to the ascending sequence of a CPU number and the port number, i.e., CPU0 port0, 1, 2 . . . →CPU1 port0, 1, 2 . . . →CPUn port0, 1, 2. . . . Accordingly, the sorting position of the slot is the sorting position of the bus value or the device value. Since the BIOS allocates the bus value and the device value to each network card device in the same sequence, based on the comparison of the bus values and the device values in the aforementioned embodiments, and based on the customization requirement, the first sorting result, and the second sorting result, the target network card device is determined.

At the same time, since the ports of each network card device are sorted in an ascending sequence, and the ascending sequence is determined based on the position values of the ports, when the target port is acquired according to the customization requirement, all ports are sorted according to the position value of each port, and the $N^{th}$ port is taken as the target port according to the customization requirement to load the on-demand ROM driver file.

In the embodiments of the present disclosure, the server preboot function self-adaptive supporting requirement may also be met in the BIOS scenario, whereby various customization requirements are met, and the enabling/disabling function implementation manners are improved.

In some optional implementations, the method further includes:

when adaptively supporting enabling/disabling of the preboot execution environment function in an operating system scenario, acquiring the target network card device according to the customization requirement, the first sorting result, and the second sorting result; and sorting the ports according to the position values, and acquiring the target port according to the customization requirement.

Optionally, in the embodiments of the present disclosure, in the operating system scenario, the $N^{th}$ port of the $M^{th}$ network card in an enumeration sequence supports the PXE function. At this time, the correspondence between the slot and the port of the network card device CPU is identified according to the target design diagram, and then a sorting position of the network card of each network card device in all slots is identified according to the ascending sequence of a CPU number and the port number, i.e., CPU0 port0, 1, 2 . . . →CPU1 port0, 1, 2 . . . →CPUn port0, 1, 2 . . . . Accordingly, the sorting position of the slot is the sorting position of the bus value or the device value. Since the BIOS allocates the bus value and the device value to each network card device in the same sequence, based on the comparison of the bus values and the device values in the aforementioned embodiments, and based on the customization requirement, the first sorting result, and the second sorting result, the target network card device is determined.

At the same time, since the ports of each network card device are sorted in an ascending sequence, and the ascending sequence is determined based on the position values of the ports, when the target port is acquired according to the customization requirement, all ports are sorted according to the position value of each port, and the $N^{th}$ port is taken as the target port according to the customization requirement to load the on-demand ROM driver file.

In the embodiments of the present disclosure, the server preboot function self-adaptive supporting requirement may also be met in the operating system scenario, whereby various customization requirements are met, and the enabling/disabling function implementation manners are improved.

In some optional implementations, the selecting the target port from a plurality of ports of the target network card device according to the target design diagram and the customization requirement includes:

acquiring a current position value of each port of the target network card device according to the target design diagram;

generating a first array according to the position values;

acquiring the customization requirement of the target object for identifying and sorting the ports;

adjusting the first array according to the customization requirement to obtain a second array; and selecting the target port from the second array.

Optionally, in the embodiments of the present disclosure, if the client requires the enabling/disabling customization for the PXE function of a port of the network card device in a specific slot, and also specifies the enumeration/identification sequence of the port, such as a first identified port, and an $N^{th}$ identified port, the specific sequence of all ports may be set according to the identification sequence specified by the client.

Specifically, the current position value of each port of the target network card device is acquired according to the target design diagram, the first array is generated according to the position value, the first sequence such as port 0, 1, 2, . . . , is changed to form a second array in a second sequence such as port 1, 0, 2, . . . , to meet the customization requirement of the identification sequence required by the client, then the target port is selected from the second array, and the on-demand ROM driver file is loaded for the target port.

In the embodiments of the present disclosure, all ports are sequenced according to the current position values of the ports and the identification serial number set by the target object (i.e., the customer) for the port, and then the target port may be selected according to the requirement of the customer, thereby meeting the diversified requirements of the customer.

In some optional implementations, the selecting, from the network card devices, a target network card device corresponding to the customization requirement includes:

determining a target bus value according to the customization requirement;

acquiring a preset bus value range corresponding to each network card device, where the preset bus value ranges are not overlapped;

performing matching between the target bus value and the preset bus value range; and in a case that the target bus value falls within a target bus value range, taking a network card device corresponding to the target bus value range as the target network card device corresponding to the target bus value, where the target bus value range is included in the preset bus value range.

Optionally, according to a chip framework design of Intel, the target network card device may be selected from the plurality of network card devices based on the bus feature.

Specifically, in the embodiments of the present disclosure, a preset bus value range is first set in advance for each network card device, where the preset bus value ranges are not overlapped.

The target bus value is determined according to the customization requirement, then the target bus value is matched with the preset bus value range, if it is determined that the target bus value falls within the target bus value range, the network card device corresponding to the target bus value range is taken as the network card device corresponds to the target bus value, and called the target network card device.

In the embodiments of the present disclosure, the target bus value determined by the customization requirements is matched with the preset bus value range corresponding to the network card devices, the network card device corresponding to the target bus value falling within the preset bus value range is taken as the target network card device, thereby achieving the support to the enabling/disabling of the preboot execution environment function.

In some optional implementations, after taking a network card device corresponding to the target bus value range as the target network card device corresponding to the target bus value, the method further includes:

determining a corresponding target port according to the target network card device; and determining a slot accommodating a processor according to the target port.

Optionally, the CPU port of each network card device (the PCIE device in FIG. 2) is externally connected with a slot, and to determine the position of the slot of each network card device, the slot may be determined in a manner of determining the port. Since the port is determined according to the network card device, in the embodiments of the present disclosure, after the target port meeting the customization requirement is determined according to the target network card device, and the corresponding slot accommodating the CPU may be determined according to the target port.

Furthermore, it should be noted that the corresponding slot, accommodating the CPU, of each port may be obtained for any network card device.

At the same time, in FIG. 2, a platform controller hub (PCH) is further included, the PCH is also connected with a PCIE device in FIG. 2, and the port of the CPU is also connected with the slot.

With the platform development, the PCH may be removed, and the number of BIOS chips may also be two.

In the embodiments of the present disclosure, based on the target port determined by the target network card device, the corresponding slot accommodating the processor (i.e., the CPU) can be identified, thereby completing the design of the entire chip construction framework.

In some optional implementations, the number of the target network card devices is multiple, and the number of the target ports is multiple.

Optionally, in the aforementioned embodiments, the PXE function enabling/disabling adaptive supporting description is made under a condition of only one target network card device and only one target port. In the present embodiment, according to the customization requirement that multiple target network card devices and multiple target ports support the enabling/disabling of the PXE function, the multiple target network card devices and the multiple target ports meeting the customization requirement may be selected in the methods of the foregoing embodiments.

In the embodiment of the present disclosure, the requirement that multiple ports of multiple network cards support the enabling/disabling of the PXE function is also met, thus realizing diversification.

In some optional implementations, the enabling the preboot execution environment function of the target port includes:

enabling the preboot execution environment function of the target port by employing an on-demand read-only memory driver file.

Optionally, the BIOS may load the ROM for each device with the on-demand ROM driver file during the enumeration of the network card devices, and the PXE function of the network card is supported by the on-demand ROM driver file.

Based on the foregoing embodiments, in the embodiment of the present disclosure, the corresponding methods for supporting the enabling/disabling of the PXE function in the foregoing embodiments may be combined to use. For example, the methods in the foregoing embodiments are combined to meet the customization requirement on supporting the enabling/disabling of the PXE function.

Figure 3:
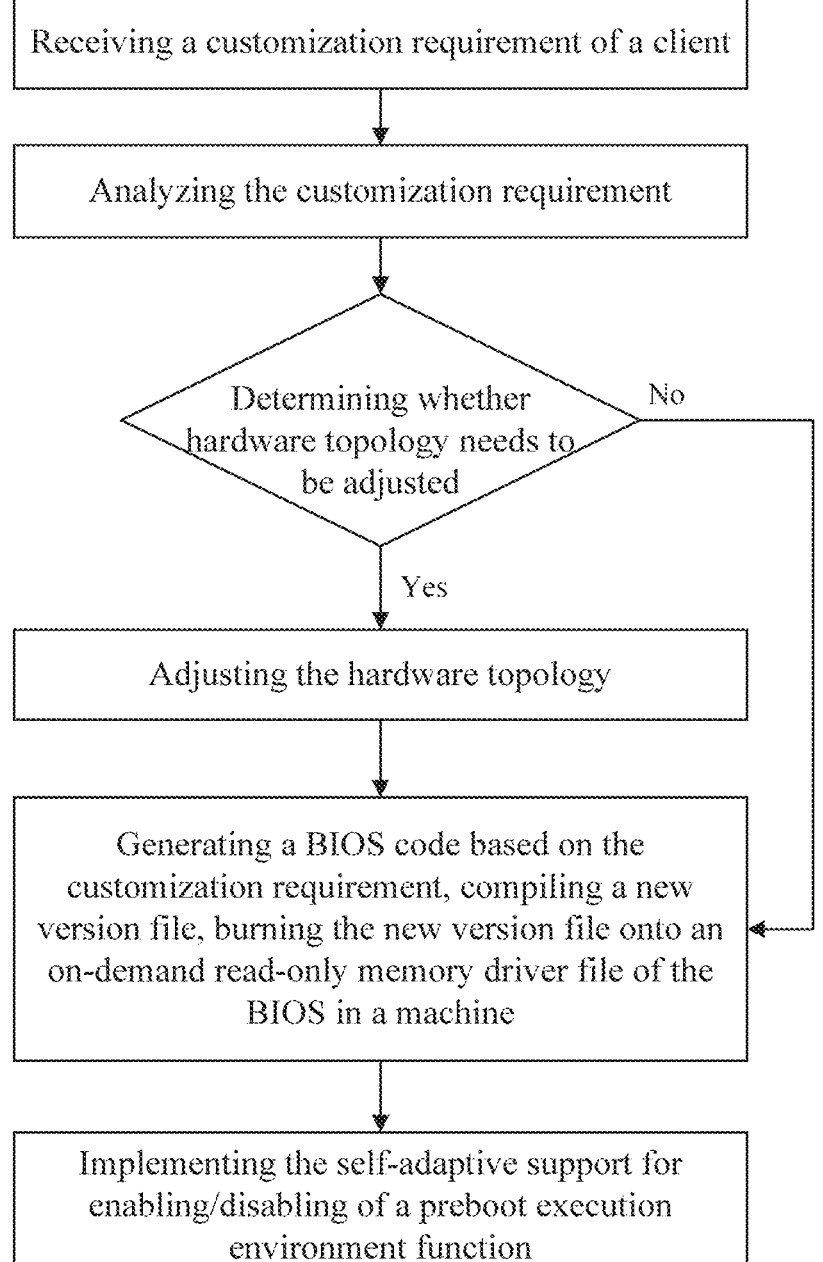
FIG. 3 is a schematic flowchart of implementation of a server preboot function self-adaptive supporting function according to one or more embodiments of the present disclosure.

In some optional implementations, as shown in FIG. 3, FIG. 3 is a schematic flowchart of implementation of a server preboot function self-adaptive supporting according to an embodiment of the present disclosure, including the following steps:

receiving customization requirements of clients;

analyzing the customization requirements;

determining whether hardware topology needs to be adjusted;

if so, adjusting the hardware topology, generating a BIOS code based on the customization requirements, compiling a new version file, burning the new version file onto an on-demand read-only memory driver file of the BIOS in a machine; and if not, generating the BIOS code directly based on the customization requirements, compiling the new version file, and burning the new version file onto the on-demand ROM driver file of the BIOS in the machine; and implementing the self-adaptive support for a server preboot function.

Specifically, the customization requirement (i.e., the functional code) is analyzed, whereby the function customization requirement of the target object can be identified, and whether the hardware topology needs to be adjusted is identified according to an analysis result. If so, the customization requirement is integrated as the functional code into the original BIOS code, and the BIOS code is edited to generate a new BIOS file. After the new BIOS file is burned onto the ROM of the machine BIOS, the new BIOS file takes effect when the machine BIOS is booted, and the customization requirement function added by the target object may also take effect. Therefore, the self-adaptive support for the server proboot function is implemented.

Figure 4:
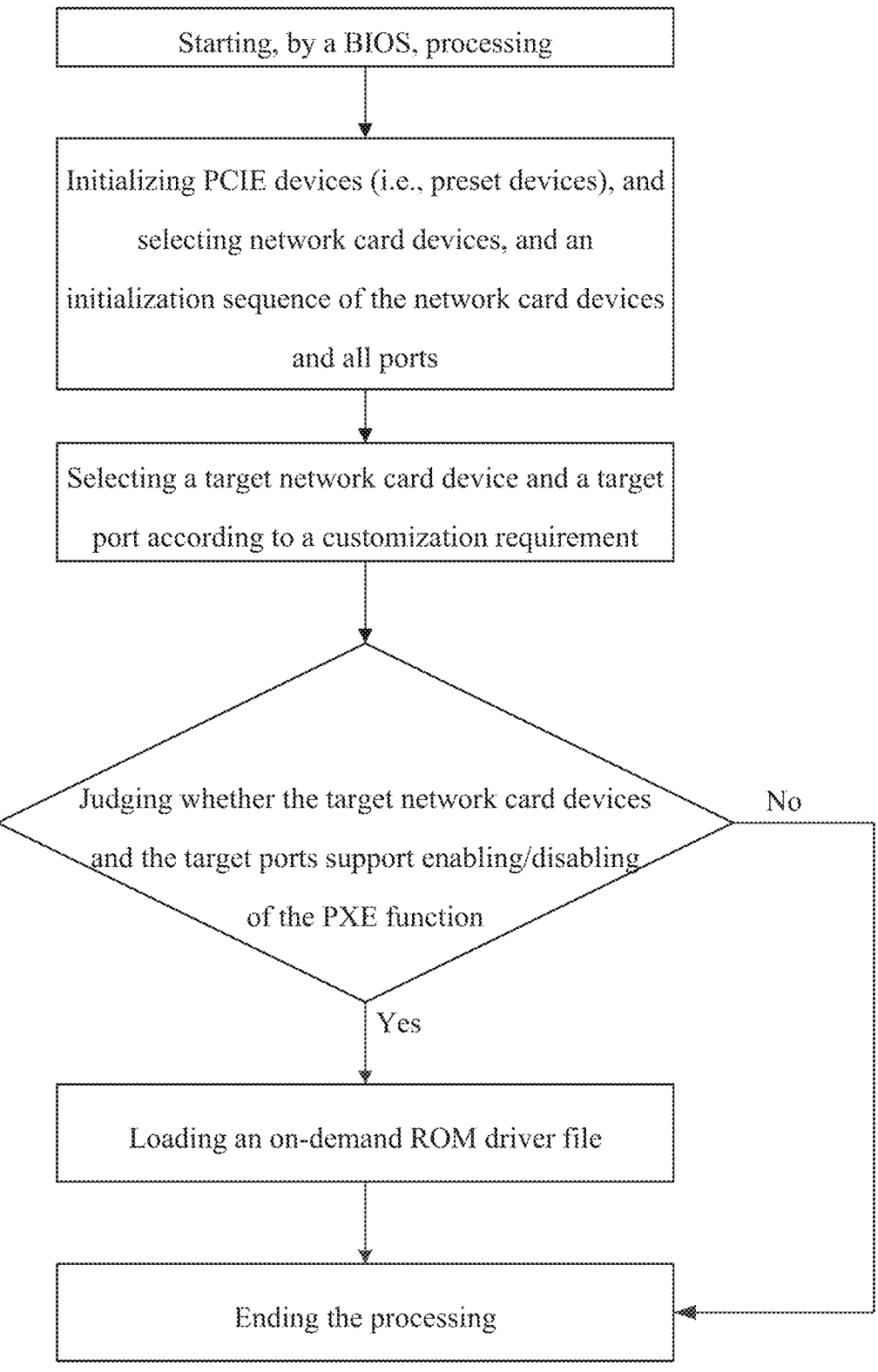
FIG. 4 is a schematic flowchart of implementation of a basic input/output system (BIOS) code function in function implementation according to one or more embodiments of the present disclosure.

In some optional implementations, as shown in FIG. 4, FIG. 4 is a schematic flowchart of implementation of a BIOS code function in function implementation according to an embodiment of the present disclosure, including the following steps:

starting, by a BIOS, processing;

initializing a PCIE device (i.e., a preset device), and selecting a network card device, and an initialization sequence of the network card device and all ports;

selecting a target network card device and a target port according to a customization requirement;

judging whether the target network card devices and the target ports support enabling/disabling of the PXE function;

if so, loading an on-demand ROM driver file, and ending the processing; and otherwise, directly ending the processing.

The present embodiment further provides a server preboot function self-adaptive supporting apparatus. The apparatus is configured to implement the foregoing embodiments and preferred implementations. Those that are already stated are not repeated herein. For example, a term "module" that may be used hereinafter is a combination of software and/or hardware that may implement a predetermined function. Although the apparatus described in the following embodiments is preferably implemented by software, the apparatus may also be implemented by a combination of software and hardware.

Figure 5:
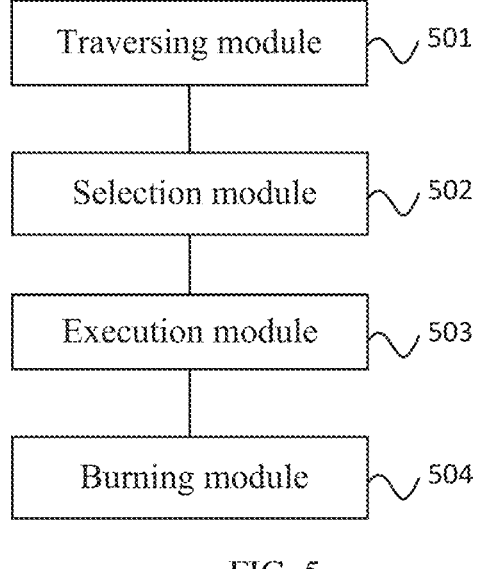
FIG. 5 is a block diagram of a server preboot function self-adaptive supporting apparatus according to one or more embodiments of the present disclosure.

The present embodiment provides a server preboot function self-adaptive supporting apparatus, as shown in FIG. 5, including:

a traversing module 501, configured to traverse network card devices in a network card device library in a case of acquiring target indication information, where the target indication information is configured for representing that a target object has a customization requirement on enabling/disabling of a preboot execution environment function;

a selection module 502, configured to select, from the network card devices, a target network card device corresponding to the customization requirement, and a target port of the target network card device;

an execution module 503, configured to enable the preboot execution environment function of the target port, and disable the preboot execution environment function of a reference port other than the target port in the target network card device; and a burning module 504, configured to compile the customization requirement into a version file and burn the version file into a read-only memory of a basic input/output system, whereby the preboot execution environment function is correspondingly enabled/disabled after the read-only memory is loaded.

In some optional implementations, the apparatus further includes:

a first acquisition module, configured to acquire a plurality of preset devices before traversing all network card devices in the network card device library;

a first determination module, configured to determine whether each preset device is a network card device according to a target value of a register in a configuration space of the preset device; and a generation module, configured to generate the network card device library from the preset devices in a case of determining that the preset devices are the network card devices.

In some optional implementations, the apparatus further includes:

a second determination module, configured to determine a corresponding topological type according to instruction information when acquiring the instruction information including a plurality of signal values before selecting the target network card device corresponding to the customization requirement and the target port of the target network card device from the network card devices; and a third determination module, configured to determine a target design diagram according to the topological type.

In some optional implementations, the selection module 502 includes:

a first acquisition unit, configured to acquire the target network card device from the network card devices according to the target design diagram and the customization requirement; and a selection unit, configured to select the target port from a plurality of ports of the target network card device according to the target design diagram and the customization requirement.

In some optional implementations, the first acquisition unit includes:

a first acquisition submodule, configured to acquire the target network card device corresponding to the customization requirement from the network card devices in a depth-first traversing manner according to the target design diagram.

In some optional implementations, the first acquisition unit includes:

a second acquisition submodule, configured to acquire a historical global variable value after acquiring the target network card device corresponding to the customization requirement from the network card devices, where the historical global variable value is configured for indicating a number of the traversed network card devices in the network card device library;

an addition submodule, configured to add a preset value to a serial number of the target network card device; and a first obtaining submodule, configured to obtain a global variable value corresponding to the target network card device based on the historical global variable value and the preset value.

In some optional implementations, the first acquisition unit includes:

a third acquisition submodule, configured to acquire a bus value and a device value of each network card device according to the target design diagram; and a fourth acquisition submodule, configured to acquire the target network card device according to the bus value, the device value, and the customization requirement.

In some optional implementations, the fourth acquisition submodule includes:

a first sorting sub-unit, configured to compare the bus values of the network card devices, and sort the bus values according to a preset sequence to obtain a first sorting result;

a comparison sub-unit, configured to compare the device values of reference network card devices in a case that the bus values in any preset number of the reference network card devices are the same;

a second sorting sub-unit, configured to sort the reference network card devices according to the device values to obtain a second sorting result; and an acquisition sub-unit, configured to acquire the target network card device according to the customization requirement, the first sorting result, and the second sorting result.

In some optional implementations, the selection unit includes:

a fifth acquisition submodule, configured to acquire a port number of each port of the target network card device according to the target design diagram; and a first selection submodule, configured to select the target port from a plurality of ports according to the customization requirement and the port number.

In some optional implementations, the selection unit includes:

a sixth acquisition submodule, configured to acquire a current position value of each port of the target network card device according to the target design diagram;

a second selection submodule, configured to select the target port from a plurality of ports according to the customization requirement and the position value.

In some optional implementations, the apparatus further includes:

a second acquisition module, configured to acquire the target network card device according to the customization requirement, the first sorting result, and the second sorting result when adaptively supporting the enabling/disabling of the preboot execution environment function in a BIOS scenario; and a third acquisition module, configured to sort the ports according to the position values, and acquire the target port according to the customization requirement.

In some optional implementations, the apparatus further includes:

a fourth acquisition module, configured to acquire the target network card device according to the customization requirement, the first sorting result, and the second sorting result when adaptively supporting the enabling/disabling of the preboot execution environment function in an operating system scenario; and a fifth acquisition module, configured to sort the ports according to the position values, and acquire the target port according to the customization requirement.

In some optional implementations, the selection unit includes:

a seventh acquisition submodule, configured to acquire a current position value of each port of the target network card device according to the target design diagram;

a generation submodule, configured to generate a first array according to the position values;

an eighth acquisition submodule, configured to acquire the customization requirement of a target object for identifying and sorting the ports;

a second obtaining submodule, configured to adjust the first array according to the customization requirement to obtain a second array; and a third selection submodule, configured to select the target port from the second array.

In some optional implementations, the selection module 502 includes:

a first determination unit, configured to determine a target bus value according to the customization requirement;

a second acquisition unit, configured to acquire a preset bus value range corresponding to each network card device, where the preset bus value ranges are not overlapped;

a matching unit, configured to perform matching between the target bus value and the preset bus value range; and a setting unit, configured to, in a case that the target bus value falls within the target bus value range, take the network card device corresponding to the target bus value range as the target network card device corresponding to the target bus value, where the target bus value range is included in the preset bus value range.

In some optional implementations, the selection module 502 includes:

a second determination unit, configured to determine the corresponding target port according to the target network card device after taking the network card device corresponding to the target bus value range as the target network card device corresponding to the target bus value; and a third determination unit, configured to determine a slot accommodating a processor according to the target port.

In some optional implementations, the number of the target network card devices is multiple, and the number of the target ports is multiple.

In some optional implementations, the enabling the preboot execution environment function of the target port includes: enabling the preboot execution environment function of the target port by employing the on-demand read-only memory driver file.

In the present embodiment, the server preboot function self-adaptive supporting apparatus is presented in a form of functional units, where the units refer to application specific integrated circuits (ASICs), processors and memories that execute one or more software or fixed programs, and/or other devices that can provide the aforementioned functions.

Further functional descriptions of the aforementioned modules and units are the same as those of the aforementioned corresponding embodiments, and are not repeated here.

An embodiment of the present disclosure provides a computer device, which includes the server preboot function self-adaptive supporting apparatus as shown in FIG. 5.

Figure 6:
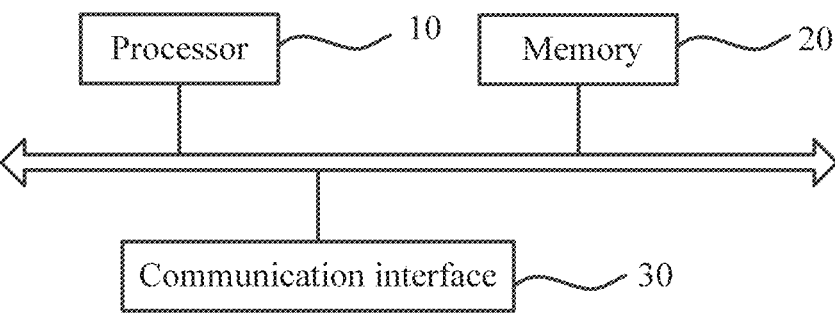
FIG. 6 is a schematic structural diagram of hardware of a computer device according to one or more embodiments of the present disclosure.

Referring to FIG. 6, FIG. 6 is a schematic structural diagram of a computer device provided by an optional embodiment of the present disclosure. As shown in FIG. 6, the computer device includes one or more processors 10, a memory 20, and an interface for connecting all components and including a high-speed interface and a low-speed interface. All components are in communication connection with one another by using different buses, and may be installed onto a public mainboard or installed in other manners according to the requirements. The processor may process instructions that are executed in the computer device, including instructions stored in or on a memory to display graphical information of a graphical user interface (GUI) on an external input/output device (such as a display device coupled to the interface). In some optional implementations, a plurality of processors and/or a plurality of buses may be used together with a plurality of memories when necessary. Similarly, a plurality of computer devices may be connected. Each computer device provides necessary operations (such as a server array, a group of blade servers, or a multi-processor system). In FIG. 6, a processor 10 is taken as an example.

The processor 10 may be a central processing unit, a network processor, or a combination thereof. The processor 10 may further include a hardware chip. The hardware chip may be an application specific integrated circuit, a programmable logic device or a combination thereof. The programmable logic device may be a complex programmable logic device, a field programmable logic gate array, a generic array logic or any combination thereof The memory 20 stores instructions capable of being executed by the at least one processor 10, whereby the at least one processor 10 executes the method in the foregoing embodiments.

The memory 20 may include a program storage area and a data storage area, where the program storage area may store an operating system and an application program required by at least one function; and the data storage area may store data created by the use of the computer device according to the presentation of a mini program landing page, etc. Furthermore, the memory 20 may include a high-speed random access memory and a non-transitory memory, such as at least one disk storage device, a flash storage device, or other non-transitory solid-state storage devices. In some optional implementations, the memory 20 optionally includes a memory that is arranged remotely relative to the processor 10. These remote memories may be connected to the computing device through a network. Examples of the network include, but are not limited to, the Internet, an Intranet, a local area network, a mobile communication network, and a combination thereof.

The memory 20 may include a volatile memory, such as a random access memory; the memory may also include a non-volatile memory, such as a flash memory, a hard disk or a solid-state hard disk; and the memory 20 may also include a combination of the foregoing memories.

The computer device further includes a communication interface 30 that is configured for communication between the computer device and another device or a communication network.

An embodiment of the present disclosure further provides one or more non-volatile computer-readable storage media having computer instructions stored therein, where the method according to the embodiments of the present disclosure may be implemented in hardware, or firmware, or may be implemented as a computer code that can be recorded in the storage medium, or downloaded through a network and originally stored in a remote storage medium or a non-transitory machine-readable storage medium and may be stored in a local storage medium, whereby the method described herein may be processed by the software that is stored in the storage medium of a general-purpose computer, a dedicated processor, or a programmable or dedicated hardware. The storage medium may be a magnetic disk, an optical disk, a read-only memory, a random access memory, a flash memory, a hard disk or a solid-state hard disk. Further, the storage medium may also include a combination of the above kinds of memories. It should be understood that a computer, a processor, a microprocessor controller or a programmable hardware includes a storage component that can store or receive the software or computer code, and when the software or computer code is accessed and executed by the computer, the processor or the hardware, the method shown in the foregoing embodiment is realized.

Although the embodiments of the present disclosure are described in combination with the drawings, those skilled in the art can make various modifications and variations without departing from the spirit and scope of the present disclosure, and the modifications and variations shall fall within the scope defined by the appended claims.

What is claimed is:

1. A server preboot function self-adaptive supporting method, applied to a basic input/output system, comprising:

provided that target indication information is acquired and functional code segments of a customization function for enabling/disabling of a preboot execution environment function is recognized, traversing network card devices in a network card device library, wherein the target indication information is configured for representing that a target object has a customization requirement on the enabling/disabling of the preboot execution environment function, and the customization requirement comprises one or more of the functional code segments of the customization function;

provided that instruction information comprising a plurality of signal values is acquired, determining a corresponding topological type according to the instruction information;

determining a target design diagram according to the topological type, and selecting, from the network card devices, a target network card device corresponding to the customization requirement, and a target port of the target network card device, wherein the selecting, from the network card devices, a target network card device corresponding to the customization requirement, and a target port of the target network card device comprises: acquiring the target network card device from the network card devices according to the target design diagram and the customization requirement; selecting the target port from a plurality of ports of the target network card device according to the target design diagram and the customization requirement;

enabling the preboot execution environment function of the target port, and disabling the preboot execution environment function of a reference port other than the target port in the target network card device; and integrating the functional code segments for the customization requirement into an original basic input/output system code of the basic input/output system, editing the original basic input/output system code to generate a new basic input/output system code file based on the integrating, and burning the new basic input/output system code file into a read-only memory of the basic input/output system, whereby the preboot execution environment function is correspondingly enabled/disabled after the read-only memory is loaded.

2. The method according to claim 1, wherein, prior to the traversing network card devices in a network card device library, the method further comprises:

acquiring a plurality of preset devices;

determining whether each preset device of the plurality of preset devices is a network card device according to a target value of a register in a configuration space of the preset device; and in response to determining that the plurality of preset devices are the network card devices, generating the network card device library from the plurality of preset devices.

3. The method according to claim 1, wherein the acquiring the target network card device from the network card devices according to the target design diagram and the customization requirement comprises:

acquiring the target network card device corresponding to the customization requirement from the network card devices in a depth-first traversing manner according to the target design diagram.

4. The method according to claim 3, wherein, after the acquiring the target network card device corresponding to the customization requirement from the network card devices, the method further comprises:

acquiring a historical global variable value, wherein the historical global variable value is configured for indicating a number of the network card devices in the network card device library that are traversed;

adding a preset value to a serial number of the target network card device; and obtaining a global variable value corresponding to the target network card device based on the historical global variable value and the preset value.

5. The method according to claim 1, wherein the acquiring the target network card device from the network card devices according to the target design diagram and the customization requirement comprises:

acquiring a bus value and a device value of each of the network card devices according to the target design diagram; and acquiring the target network card device according to the bus value, the device value, and the customization requirement.

6. The method according to claim 5, wherein the acquiring the target network card device according to the bus value, the device value, and the customization requirement comprises:

comparing the bus values of the network card devices, and sorting the bus values according to a preset sequence to obtain a first sorting result;

in response to the bus values of any preset number of reference network card devices being the same, comparing the device values of the reference network card devices;

sorting the reference network card devices according to the device values to obtain a second sorting result; and acquiring the target network card device according to the customization requirement, the first sorting result, and the second sorting result.

7. The method according to claim 6, wherein the selecting the target port from a plurality of ports of the target network card device according to the target design diagram and the customization requirement comprises:

acquiring a port number of each port of the plurality of ports of the target network card device according to the target design diagram; and selecting the target port from the plurality of ports according to the customization requirement and the port number.

8. The method according to claim 6, wherein the selecting the target port from a plurality of ports of the target network card device according to the target design diagram and the customization requirement comprises:

acquiring a current position value of each port of the plurality of ports of the target network card device according to the target design diagram; and selecting the target port from the plurality of ports according to the customization requirement and the current position value.

9. The method according to claim 8, further comprising:

in response to adaptively supporting enabling/disabling of the preboot execution environment function in a basic input/output system scenario, acquiring the target network card device according to the customization requirement, the first sorting result, and the second sorting result; and sorting the plurality of ports according to the current position values, and acquiring the target port according to the customization requirement.

10. The method according to claim 8, further comprising:

in response to adaptively supporting the enabling/disabling of the preboot execution environment function in an operating system scenario, acquiring the target network card device according to the customization requirement, the first sorting result, and the second sorting result; and sorting the plurality of ports according to the current position values, and acquiring the target port according to the customization requirement.

11. The method according to claim 6, wherein the selecting the target port from a plurality of ports of the target network card device according to the target design diagram and the customization requirement comprises:

acquiring a current position value of each port of the plurality of ports of the target network card device according to the target design diagram;

generating a first array according to the current position values;

acquiring the customization requirement of the target object for identifying and sorting the plurality of ports;

adjusting the first array according to the customization requirement to obtain a second array; and selecting the target port from the second array.

12. The method according to claim 1, wherein the selecting, from the network card devices, a target network card device corresponding to the customization requirement comprises:

determining a target bus value according to the customization requirement;

acquiring a preset bus value range corresponding to each of the network card devices, wherein the preset bus value ranges are not overlapped;

performing matching between the target bus value and the preset bus value range; and in response to the target bus value falling within a target bus value range, taking a network card device corresponding to the target bus value range as the target network card device corresponding to the target bus value, wherein the target bus value range is comprised in the preset bus value range.

13. The method according to claim 12, wherein, after the taking a network card device corresponding to the target bus value range as the target network card device corresponding to the target bus value, the method further comprises:

determining a corresponding target port according to the target network card device; and determining a slot accommodating a processor according to the target port.

14. The method according to claim 13, wherein the enabling the preboot execution environment function of the target port comprises:

enabling the preboot execution environment function of the target port by employing an on-demand read-only memory driver file.

15. The method according to claim 13, wherein a number of the target network card devices is multiple, and a number of the target ports is multiple.

16. The method according to claim 2, wherein a number of the target network card devices is multiple, and a number of the target ports is multiple.

17. The method according to claim 1, wherein the enabling the preboot execution environment function of the target port comprises:

enabling the preboot execution environment function of the target port by employing an on-demand read-only memory driver file.

18. The method according to claim 1, wherein a number of the target network card devices is multiple, and a number of the target ports is multiple.

19. A computer device, comprising:

a memory and a processor, wherein the memory and the processor are in communication connection with each other, the memory has computer instructions stored therein, the processor executes the computer instructions to perform a server preboot function self-adaptive supporting method, comprising:

when target indication information is acquired and functional code segments of a customization function for enabling/disabling of a preboot execution environment function is recognized, traversing network card devices in a network card device library, wherein the target indication information is configured for representing that a target object has a customization requirement on the enabling/disabling of the preboot execution environment function, and the customization requirement comprises one or more of the functional code segments of the customization function;

when instruction information comprising a plurality of signal values is acquired, determining a corresponding topological type according to the instruction information;

determining a target design diagram according to the topological type, and selecting, from the network card devices, a target network card device corresponding to the customization requirement, and a target port of the target network card device, wherein the selecting, from the network card devices, a target network card device corresponding to the customization requirement, and a target port of the target network card device comprises: acquiring the target network card device from the network card devices according to the target design diagram and the customization requirement; selecting the target port from a plurality of ports of the target network card device according to the target design diagram and the customization requirement;

enabling the preboot execution environment function of the target port, and disabling the preboot execution environment function of a reference port other than the target port in the target network card device; and after integrating the functional code segments for the customization requirement into an original basic input/output system code of a basic input/output system, editing the basic input/output system code to generate a new basic input/output system code file, and burning the new basic input/output system code file into a read-only memory of the basic input/output system, whereby the preboot execution environment function is correspondingly enabled/disabled after the read-only memory is loaded.

20. A non-transitory computer-readable storage media, wherein the non-transitory computer-readable storage media has computer instructions stored therein, the computer instructions are used to enable a computer to perform a server preboot function self-adaptive supporting method, comprising:

when target indication information is acquired and functional code segments of a customization function for enabling/disabling of a preboot execution environment function is recognized, traversing network card devices in a network card device library, wherein the target indication information is configured for representing that a target object has a customization requirement on the enabling/disabling of the preboot execution environment function, and the customization requirement comprises one or more of the functional code segments of the customization function;

when instruction information comprising a plurality of signal values is acquired, determining a corresponding topological type according to the instruction information;

determining a target design diagram according to the topological type, and selecting, from the network card devices, a target network card device corresponding to the customization requirement, and a target port of the target network card device, wherein the selecting, from the network card devices, a target network card device corresponding to the customization requirement, and a target port of the target network card device comprises: acquiring the target network card device from the network card devices according to the target design diagram and the customization requirement; selecting the target port from a plurality of ports of the target network card device according to the target design diagram and the customization requirement;

enabling the preboot execution environment function of the target port, and disabling the preboot execution environment function of a reference port other than the target port in the target network card device; and after integrating the functional code segments for the customization requirement into an original basic input/output system code of a basic input/output system, editing the basic input/output system code to generate a new basic input/output system code file, and burning the new basic input/output system code file into a read-only memory of the basic input/output system, whereby the preboot execution environment function is correspondingly enabled/disabled after the read-only memory is loaded.

\* \* \* \* \*

26